(12) United States Patent  
Lee et al.

(10) Patent No.: US 8,753,106 B2
(45) Date of Patent: Jun. 17, 2014

(54) BILLET CARRIER ASSEMBLY

(71) Applicant: Printpack Illinois, Inc., Elgin, IL (US)

(72) Inventors: Richard Henry Lee, Forest, VA (US); Jean-Marc Henri Kirouac, Lanexa, VA (US); Matthew Neil Piercy, Seaford, VA (US)

(73) Assignee: Printpack Illinois, Inc., Elgin, IL (US)

( * ) Notice: Subject to any disclaimer, the term of this patent is extended or adjusted under 35 U.S.C. 154(b) by 0 days.

(21) Appl. No.: 13/651,953

(22) Filed: Oct. 15, 2012

(65) Prior Publication Data

US 2013/0048467 A1 Feb. 28, 2013

Related U.S. Application Data

(62) Division of application No. 12/570,520, filed on Sep. 30, 2009, now Pat. No. 8,287,270.

(51) Int. Cl.
*B29C 31/08* (2006.01)
*B29C 51/00* (2006.01)

(52) U.S. Cl.
USPC ........ 425/403.1; 425/DIG. 48; 425/DIG. 127

(58) Field of Classification Search
USPC ............... 425/384, 388, 394, 403.1, DIG. 48, 425/DIG. 127
See application file for complete search history.

(56) References Cited

U.S. PATENT DOCUMENTS

| 2,745,135 | A | 5/1956 | Gora |
| 3,115,677 | A | 12/1963 | Thiel |
| 3,409,939 | A | 11/1968 | Hey |
| 3,546,746 | A | 12/1970 | Johnson |
| 3,605,192 | A | 9/1971 | Edwards |
| 3,684,258 | A | 8/1972 | Coffman et al. |
| 3,954,374 | A | 5/1976 | Wommelsdorf et al. |
| 3,964,237 | A | 6/1976 | Johansen |
| 4,235,579 | A | 11/1980 | Kurz et al. |
| 4,274,533 | A | 6/1981 | Abe |
| 4,323,531 | A | 4/1982 | Bradley et al. |
| 4,563,325 | A | 1/1986 | Coffman |
| 4,619,806 | A | 10/1986 | Gunn |
| 4,778,551 | A | 10/1988 | Coffman |

(Continued)

FOREIGN PATENT DOCUMENTS

| DE | 3410960 | 10/1985 |
| EP | 0972627 | 1/2000 |

(Continued)

OTHER PUBLICATIONS

PCT International Search Report for PCT/US2010/050769 mailed Aug. 8, 2011.

*Primary Examiner* — Joseph S Del Sole
*Assistant Examiner* — Thukhanh Nguyen
(74) *Attorney, Agent, or Firm* — Sutherland Asbill & Brennan LLP

(57) ABSTRACT

Methods and systems for producing thermoformed articles from pre-cut thermoformable billets are provided. The system may include a heating apparatus for heating the billets, a billet thermoformer for thermoforming the billet into an article, a discharge system for evacuated the formed articles from the thermoformer, and an inspection system for inspecting each of the formed articles for the presence of a defect. Conveyors and billet carriers are provided for transporting the billets between the various components of the system, and loaders are provided for loading the billets onto the conveyor and/or billet carriers.

22 Claims, 12 Drawing Sheets

(56) References Cited

U.S. PATENT DOCUMENTS

| | | | |
|---|---|---|---|
| 4,790,792 | A | 12/1988 | Bopp |
| 4,836,764 | A | 6/1989 | Parkinson |
| 4,883,633 | A | 11/1989 | French |
| 4,972,093 | A | 11/1990 | Cochran et al. |
| 5,091,231 | A | 2/1992 | Parkinson |
| 5,185,117 | A | 2/1993 | Hawley |
| 5,256,341 | A | 10/1993 | Denis et al. |
| 5,322,651 | A | 6/1994 | Emmer |
| 5,394,603 | A | 3/1995 | Reil et al. |
| 5,429,346 | A | 7/1995 | Andersson et al. |
| 5,501,552 | A | 3/1996 | Simkowski |
| 5,531,375 | A | 7/1996 | Palm |
| 5,536,231 | A | 7/1996 | Nilsson |
| 5,587,192 | A | 12/1996 | Beizermann |
| 5,591,462 | A | 1/1997 | Darling et al. |
| 5,620,715 | A | 4/1997 | Hart et al. |
| 5,649,619 | A | 7/1997 | Kasik |
| 5,651,930 | A | 7/1997 | Murching |
| 5,683,729 | A | 11/1997 | Valles |
| 5,727,369 | A | 3/1998 | Mosse |
| 5,785,921 | A | 7/1998 | Outreman et al. |
| 5,792,491 | A | 8/1998 | Chaure |
| 5,803,291 | A | 9/1998 | Valles |
| 5,857,562 | A | 1/1999 | Evrard |
| 5,863,571 | A | 1/1999 | Santais et al. |
| 5,920,677 | A | 7/1999 | Emmer et al. |
| 5,968,560 | A | 10/1999 | Briere et al. |
| 6,053,723 | A | 4/2000 | Guiffant et al. |
| 6,061,125 | A | 5/2000 | Thomas et al. |
| 6,076,437 | A | 6/2000 | Saint Martin |
| 6,086,800 | A | 7/2000 | Manlove |
| 6,089,854 | A | 7/2000 | Outreman et al. |
| 6,094,890 | A | 8/2000 | Michellon et al. |
| 6,125,996 | A | 10/2000 | Cornet et al. |
| 6,176,369 | B1 | 1/2001 | Petrovic |
| 6,192,281 | B1 | 2/2001 | Brown et al. |
| 6,224,817 | B1 | 5/2001 | Villers |
| 6,225,394 | B1 | 5/2001 | Lan et al. |
| 6,238,060 | B1 | 5/2001 | Bourn et al. |
| 6,241,846 | B1 | 6/2001 | Contente et al. |
| 6,423,253 | B1 | 7/2002 | Bunel et al. |
| 6,444,159 | B2 | 9/2002 | Petre |
| 6,447,281 | B1 | 9/2002 | Petre |
| 6,464,486 | B1 | 10/2002 | Barray et al. |
| 6,470,650 | B1 | 10/2002 | Lohwasser |
| 6,570,177 | B1 | 5/2003 | Struckhoff et al. |
| 6,591,967 | B1 | 7/2003 | Doudement et al. |
| 6,615,472 | B2 | 9/2003 | Petre |
| 6,648,623 | B2 | 11/2003 | Petre |
| 6,685,789 | B1 | 2/2004 | Wissing |
| 6,692,684 | B1 | 2/2004 | Nantin et al. |
| 6,705,853 | B1 | 3/2004 | Nehring |
| 6,709,611 | B1 | 3/2004 | Emmer et al. |
| 6,733,272 | B1 | 5/2004 | Derouault et al. |
| 6,736,625 | B1 | 5/2004 | Linglet |
| 6,736,629 | B1 | 5/2004 | Derouault et al. |
| 6,749,419 | B2 | 6/2004 | Nightingale et al. |
| 6,761,556 | B1 | 7/2004 | Pellegatta et al. |
| 6,769,895 | B2 | 8/2004 | Derouault et al. |
| 6,773,251 | B2 | 8/2004 | Nightingale |
| 6,779,651 | B1 | 8/2004 | Linglet et al. |
| 6,799,195 | B1 | 9/2004 | Thibault et al. |
| 6,805,548 | B1 | 10/2004 | Evrard |
| 6,810,926 | B2 | 11/2004 | Stocchi |
| 6,811,389 | B1 | 11/2004 | Guiffant et al. |
| 6,811,390 | B1 | 11/2004 | Sattler et al. |
| 6,851,943 | B1 | 2/2005 | Novosat |
| 6,869,072 | B2 | 3/2005 | Andersson |
| 6,888,541 | B2 | 5/2005 | Morse |
| 6,896,506 | B1 | 5/2005 | Jordan |
| 6,945,260 | B1 | 9/2005 | Stocchi et al. |
| 6,968,936 | B2 | 11/2005 | Charpentier |
| 7,007,793 | B2 | 3/2006 | Stocchi |
| 7,052,644 | B2 | 5/2006 | Larsen |
| 7,140,871 | B2 | 11/2006 | Evrard |
| 7,165,956 | B2 | 1/2007 | Santais et al. |
| 7,172,406 | B2 | 2/2007 | Evrard |
| 7,227,166 | B2 | 6/2007 | Cochran et al. |
| 7,241,130 | B2 | 7/2007 | Arakelyan |
| 7,249,944 | B2 | 7/2007 | Arakelyan et al. |
| RE39,769 | E | 8/2007 | Briere et al. |
| 7,255,552 | B2 | 8/2007 | Michelon et al. |
| 7,261,533 | B2 | 8/2007 | Wrosz et al. |
| 7,284,778 | B1 | 10/2007 | Pellegatta |
| 7,291,811 | B2 | 11/2007 | Evrard et al. |
| 7,295,317 | B2 | 11/2007 | Niedermeier et al. |
| 7,311,513 | B2 | 12/2007 | Schwab et al. |
| 7,340,086 | B2 | 3/2008 | Werzinger |
| 7,393,202 | B1 | 7/2008 | Slutsky et al. |
| 7,481,640 | B1 | 1/2009 | Jordan |
| 7,841,640 | B2 | 11/2010 | Bowen |
| 2002/0017745 | A1 | 2/2002 | Vorenkamp et al. |
| 2002/0079617 | A1* | 6/2002 | Kageyama et al. ........... 425/384 |
| 2002/0123864 | A1 | 9/2002 | Eryurek et al. |
| 2002/0186302 | A1 | 12/2002 | Pulkinnen |
| 2003/0068823 | A1 | 4/2003 | Alling et al. |
| 2003/0221998 | A1 | 12/2003 | Ogburn |
| 2004/0230643 | A1 | 11/2004 | Thibault et al. |
| 2005/0194719 | A1 | 9/2005 | Jordan |
| 2005/0238753 | A1 | 10/2005 | Arakelyan et al. |
| 2006/0011604 | A1 | 1/2006 | Evrard et al. |
| 2006/0109013 | A1 | 5/2006 | Kinoshita et al. |
| 2006/0127525 | A1 | 6/2006 | Schwab et al. |
| 2007/0045321 | A1 | 3/2007 | Fox et al. |
| 2007/0127018 | A1 | 6/2007 | Lindner et al. |
| 2007/0235906 | A1 | 10/2007 | Trouillet |
| 2008/0023870 | A1 | 1/2008 | Jordan |
| 2008/0265464 | A1* | 10/2008 | D'Hooghe et al. ........... 264/322 |

FOREIGN PATENT DOCUMENTS

| | | |
|---|---|---|
| EP | 1066950 | 1/2001 |
| FR | 2766123 | 1/1999 |
| FR | 2842136 | 1/2004 |
| JP | 57095406 | 6/1982 |
| JP | 3199949 | 8/1991 |
| WO | 2004022300 | 3/2004 |
| WO | 2008095280 | 8/2008 |

* cited by examiner

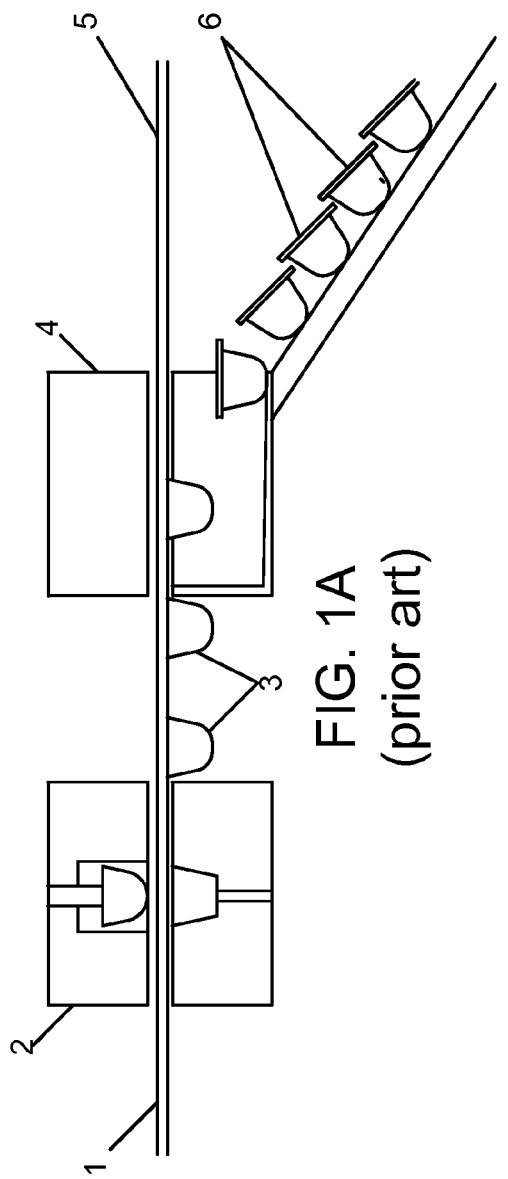
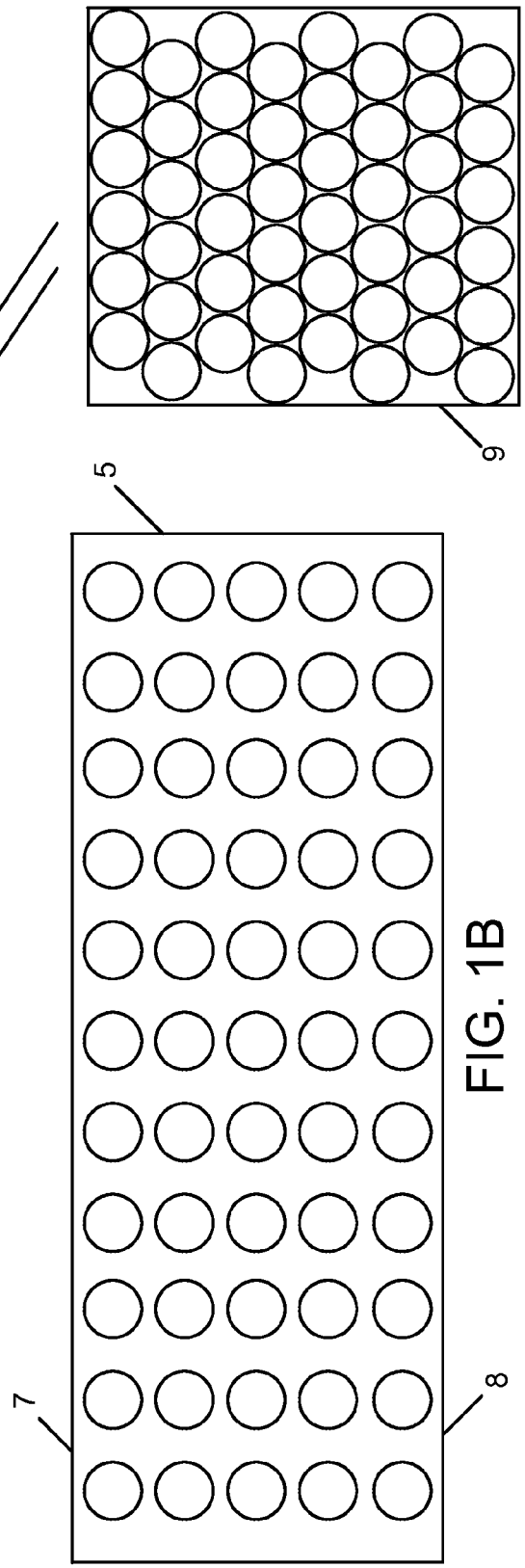
FIG. 1A (prior art)
FIG. 1B (prior art)
FIG. 2

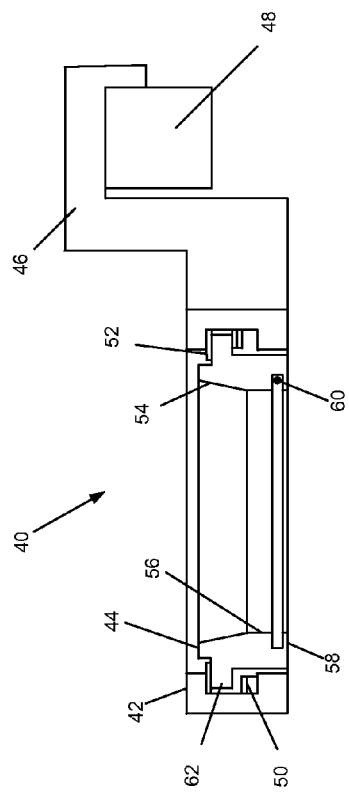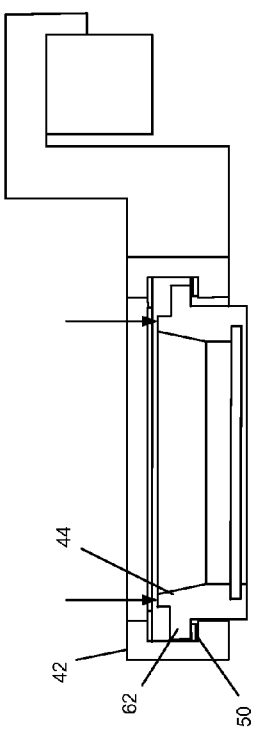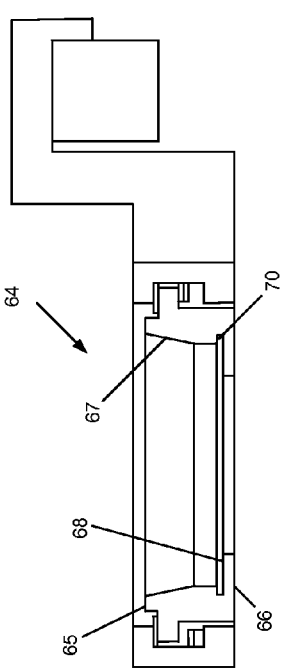

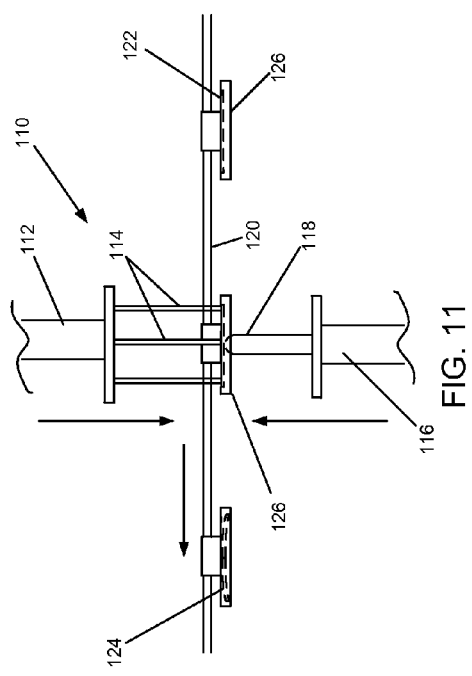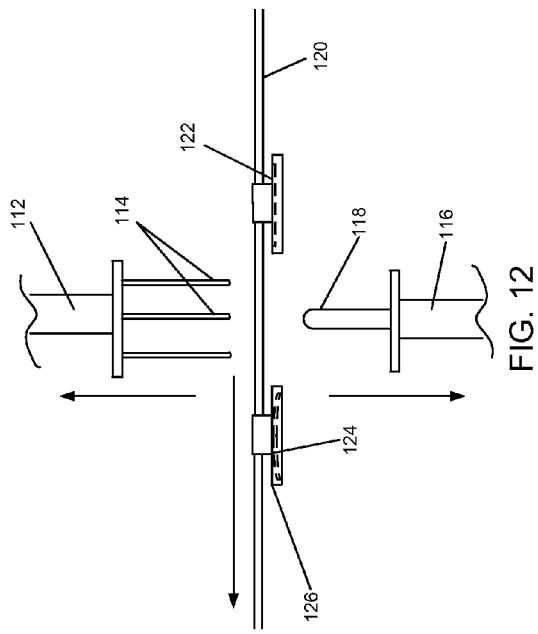

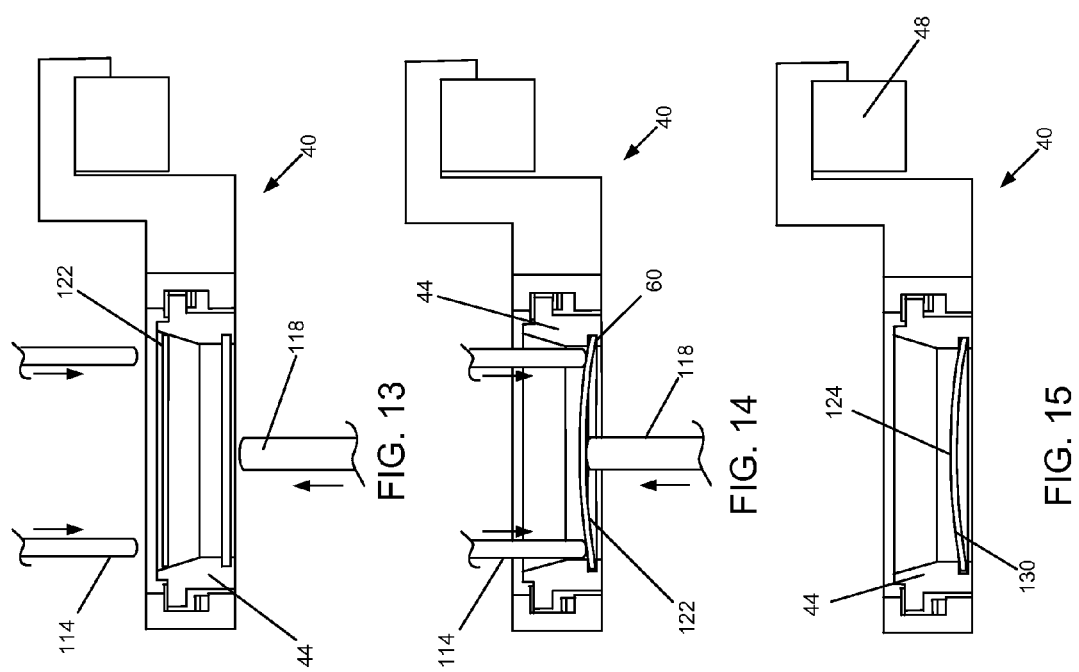

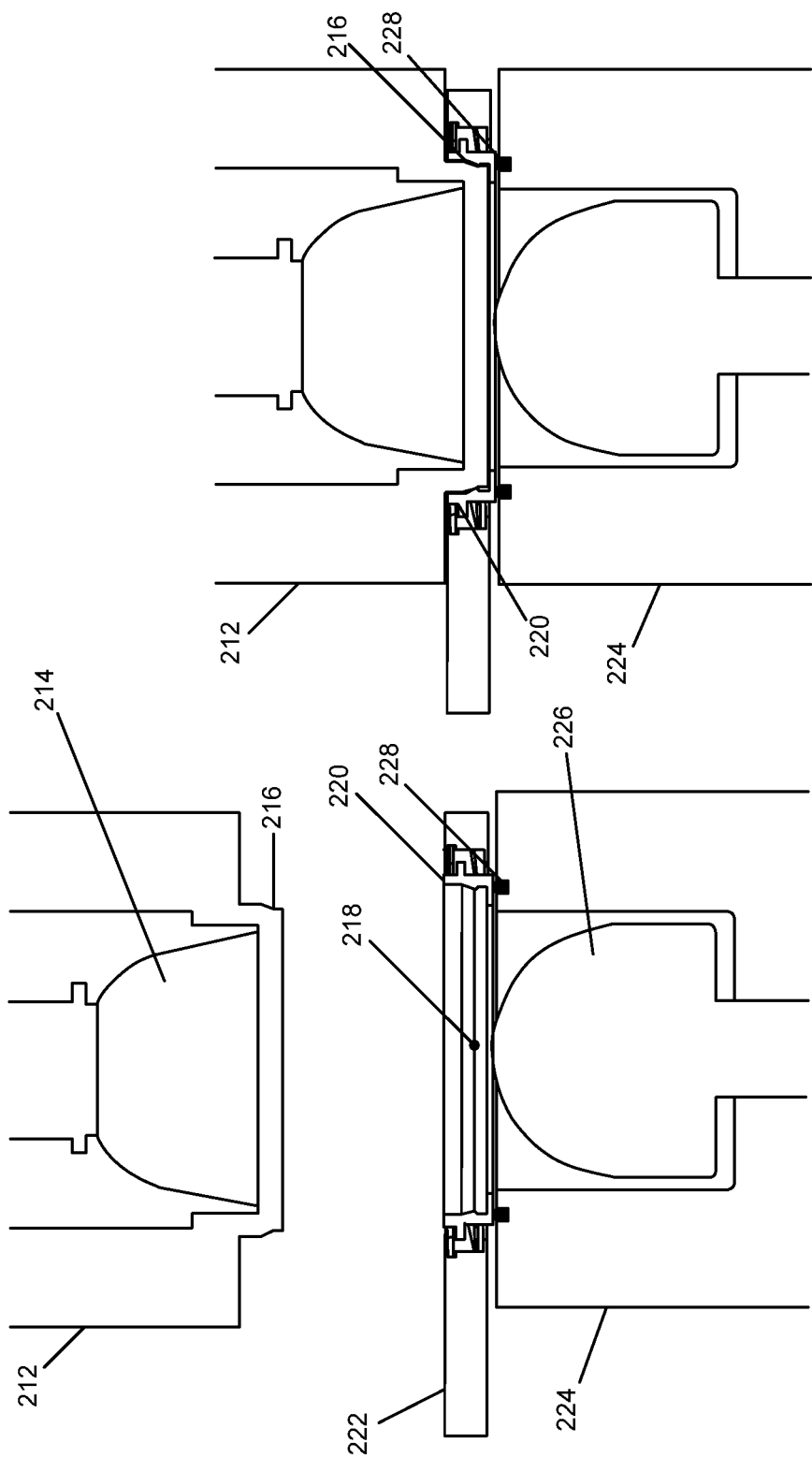

BILLET CARRIER ASSEMBLY

RELATED APPLICATION

This present application is a divisional of U.S. patent application Ser. No. 12/570,520, filed on Sep. 30, 2009, and entitled "Methods and Systems for Thermoforming With Billets." The foregoing application is incorporated by reference in its entirety.

FIELD

The present invention relates generally to thermoforming systems, and more particularly to apparatuses, systems, and methods for thermoforming with billets.

BACKGROUND

Containers for foodstuffs are generally produced by conventional thermoforming processes. These processes typically involve feeding a continuous thermoformable polymeric sheet from a feed spool or extruder through a thermoformer where a thermoformed container is formed in the sheet, and subsequently cutting the containers from the sheet. In some processes, the container is filled and sealed prior to cutting the container from the sheet. In other processes, the containers are cut from the sheet and then transported to another location for filling.

FIG. 1A illustrates a conventional thermoforming process. In this exemplary process, a polymeric sheet 1 is fed through a thermoformer 2 where thermoformed containers 3 are formed into the sheet 1. The thermoformed containers 3 are then cut from the sheet 1 by a cutting die 4. The cut containers 6 may then be sent via a conveyor to a packaging station or directly to a filling station to be filled with a product. The resulting waste sheet 5 is then collected and reprocessed.

As illustrated in FIG. 1B, conventional thermoforming processes generate a substantial amount of waste. The waste sheet 5 often comprises a substantial amount of leftover web material from sheet 1. Typically, only 55 to 60 percent of sheet 1 is utilized. The remaining 40 to 45 percent is waste and is recycled. This underutilization of the sheet increases production costs by increasing recycling and extrusion demands. Also, the amount of recycle material used when extruding the sheet 1 may be limited to control the appearance and performance of the formed containers.

As mentioned previously, in many cases, the formed containers are shipped to a different location for filling. The packaging must be prepared in such a way to protect the containers during shipment. Moreover, trucks and sea containers are typically maxed out on the volume of the containers rather than the weight. Accordingly, shipping costs for preformed containers may be high due to the low container bulk density and the high cost of protective packaging material.

Furthermore, containers produced by conventional thermoforming processes tend to have a relatively high dimensional variability between containers. There are factors that negatively affect the dimensional consistency and overall quality of containers produced by conventional thermoforming processes. First, the processing window for the polymeric sheet 1 may have a tolerance of only a few degrees due to the semi-crystalline nature of some polymers, such as polypropylene. Also, the inherent low melt strength of some polymers such as polypropylene may result in the sheet sagging as it reaches forming temperature.

The multi-lane design of the thermoformer may also contribute to the dimensional variability between containers. Referring back to FIG. 1A, the sheet 1 travels in the machine direction (i.e., from left to right in FIG. 1A). As shown in FIG. 1B, the sheet has two edges 7, 8.

Due to the edge effects, the outboard cavities (i.e., the mold cavities used to form containers with material proximal to the edges 7, 8) tend to be cooler than the center cavities. Similarly, the two dimensional tooling array results in cooling inconsistencies across the tool. Moreover, the intermittent motion of the thermoforming process may result in additional temperature inconsistencies between containers formed in the same lane in the machine direction.

Accordingly, it would be desirable to provide a new thermoforming process which allows for more efficient utilization of the polymeric sheet. It would also be desirable to provide new thermoforming processes which reduce the costs associated with transporting container materials. Furthermore, it would be desirable to provide new thermoforming processes which produce consistent cavity-to-cavity quality containers.

SUMMARY

In one aspect, a billet thermoforming system is provided. The billet thermoforming system may comprise a heating apparatus having one or more heating elements and a conveyor configured to transport a plurality of billets through the heating apparatus as a single-lane series along a billet transport path. The billet thermoforming system may further include a billet loader configured to load each of the plurality of billets on the conveyor, and a billet thermoformer configured to form each of the plurality of billets into an article after each of the plurality of billets is heated by the heating apparatus.

In another aspect, a billet thermoforming system comprising a single-lane rotary thermoformer being configured to receive a feed of thermoformable billets from a conveyor and to form each of the thermoformable billets into an article while rotating continuously is provided.

In yet another aspect, a billet thermoforming system is provided that comprises a single-lane heating apparatus having one or more radiant heating elements, a single-lane rotary billet thermoformer configured to form each of a plurality of billets into an article while rotating continuously, a discharge system adapted to evacuate each article from the billet thermoformer, and a rotary inspection system configured to inspect each article evacuated from the billet thermoformer for the presence of a defect. One or more conveyors may be provided to transport the plurality of billets through the heating apparatus as a single-lane series along a billet transport path and from the heating apparatus to the billet thermoformer, and a billet loader may be provided to load each of the plurality of billets on at least one of the one or more conveyors.

In another aspect, a method of producing a thermoformed article from a billet is provided. The method may comprise loading a plurality of billets as a series of single billets in a single lane on a conveyor, transporting the plurality of billets through a heating apparatus on the conveyor; and thermoforming each of the plurality of billets in a thermoformer after the billet is heated in the heating apparatus to produce a thermoformed article.

In another aspect, a billet thermoforming apparatus for a billet thermoforming system is provided. The billet thermoforming apparatus may comprise a rotating forming wheel having an axis of rotation, and a plurality of form molds attached to the rotating forming wheel such that the plurality of form molds are positioned angularly around the axis of rotation. Each of the plurality of form molds may be configured to engage a billet carrier while rotating about the axis of rotation to form a thermoformed article with a billet within the billet carrier.

In another aspect, a method is provided for producing a thermoformed article from a billet. The method may comprise the steps of providing a series of billet carriers each carrying an individual pre-heated billet, providing a thermoformer comprising a plurality of form molds each having a mold cavity, each form mold being configured to engage one of the billet carriers, sequentially engaging each of the series of billet carriers with one of the plurality of form molds; and thereafter sequentially forming a thermoformed article in the mold cavity of each form mold from each individual pre-heated billet.

In another aspect, a billet carrier assembly is provided for transporting billets on a conveyor. The billet carrier assembly may comprise an outer carrier portion, and a billet-contacting inner portion attached to and situated within the outer carrier portion. The billet contacting inner portion may have a top, a bottom, an inner wall extending from the top to the bottom, and the billet contacting inner portion may be moveable relative to the outer carrier portion.

In another aspect, a billet carrier assembly is provided that includes a thermoformable billet having a major surface, and a billet carrier adapted to contain the thermoformable billet. The billet carrier may comprise a top, a bottom, and an inner wall extending between the top and the bottom, the inner wall having at least one portion defining a billet-receiving cavity having a cross-cavity width measured from opposite sides of the inner wall that is less than the width of the major surface of the thermoformable billet.

In yet another aspect, a billet carrier assembly is provided for transporting billets. The billet carrier is adapted to contain the thermoformable billet, and the billet carrier comprises a top, a bottom, and an inner wall extending between the top and the bottom. The inner wall has at least one portion defining a billet-receiving cavity having a width measured from opposite sides of the inner wall across the cavity that is less than the width of the major surface of the thermoformable billet. The at least one portion of the inner wall has a billet-retaining groove situated therein. The cross-cavity width of the billet-receiving cavity measured from opposite sides of the inner wall between the billet-retaining groove and the top of the billet carrier adjacent to the billet-retaining groove may be substantially the same as the width of the inner wall measured from opposite sides of the inner wall between the billet-retaining groove and the bottom of the billet carrier adjacent to the billet-retaining groove.

In another aspect, a method is provided for seating billets in billet carriers. The method comprises providing a plurality of thermoformable billets, each of the thermoformable billets having a major surface and a plurality of billet carriers, each of the billet carriers adapted to contain the thermoformable billet, each of the plurality of billet carriers comprising a top, a bottom, and an inner wall extending between the top and the bottom, the inner wall having at least one portion defining a billet-receiving cavity having a cross-cavity width measured from opposite sides of the inner wall that is less than the width of the major surface of the thermoformable billet. The at least one portion of the inner wall has a billet-retaining groove situated therein. The billet-receiving cavity has a width measured from opposite side of the inner wall within the billet-retaining groove that is less than the width of the major surface of the thermoformable billet. The method further comprises seating each of the thermoformable billets in the billet-retaining groove of one of the plurality of billet carriers such that each billet forms a dome with a convex surface facing in the same pre-designated direction.

In another aspect, a system is provided for analyzing a container formed from a billet. The system may include a container positioning device operable for releasably attaching to the container and moving the container, and an inspection system operable for detecting the presence of a defect in the container. The inspection system may include an inspection camera. The container positioning device may be configured to move the container to a position where the inspection camera can capture an image of the container suitable for the inspection system to analyze the container for the presence of the defect.

In another aspect, a method is provided for analyzing a container formed from a billet. The method may include the steps of providing a container positioning device operable for releasably attaching to the container and moving the container; positioning the container in front of an inspection camera with the container positioning device; capturing an image of the container with the inspection camera; automatically analyzing the image of the container for the presence of a defect using a computer; and discarding the container using the container positioning device if the defect is detected.

DRAWINGS

FIG. 1A is a schematic, illustrating part of a prior art thermoforming process.

FIG. 1B is a plan view, illustrating a waste sheet resulting from a prior art thermoforming process.

FIG. 2 is a plan view, illustrating a waste sheet resulting from a billet cutting process.

FIG. 5 is a section view, illustrating an embodiment of a carrier ring assembly in accordance with an embodiment of the present invention.

FIG. 6 is a section view, illustrating the carrier ring assembly of FIG. 5 with a compressed wave spring.

FIG. 7 is a section view, illustrating a second embodiment of a carrier ring assembly.

FIG. 11 is an elevation view, illustrating the operation of a tamping device for use in a billet thermoforming system in accordance with an embodiment of the present invention.

FIG. 12 is an elevation view, illustrating the operation of the tamping device in FIG. 11.

FIG. 13 is a section view, illustrating the engagement of the tamping device of FIG. 11 with a carrier ring assembly.

FIG. 14 is a section view, illustrating the engagement of the tamping device of FIG. 11 with a carrier ring assembly as the tamping device seats a billet in a billet-retaining groove.

FIG. 15 is a section view, illustrating a domed billet seated in the billet-retaining groove of the carrier ring assembly after tamping with the device in FIG. 11.

FIGS. 19 and 20 are sectional elevation views, illustrating the engagement of a form mold and a billet carrier in accordance with an embodiment of the present invention.

DETAILED DESCRIPTION

Figure 3:
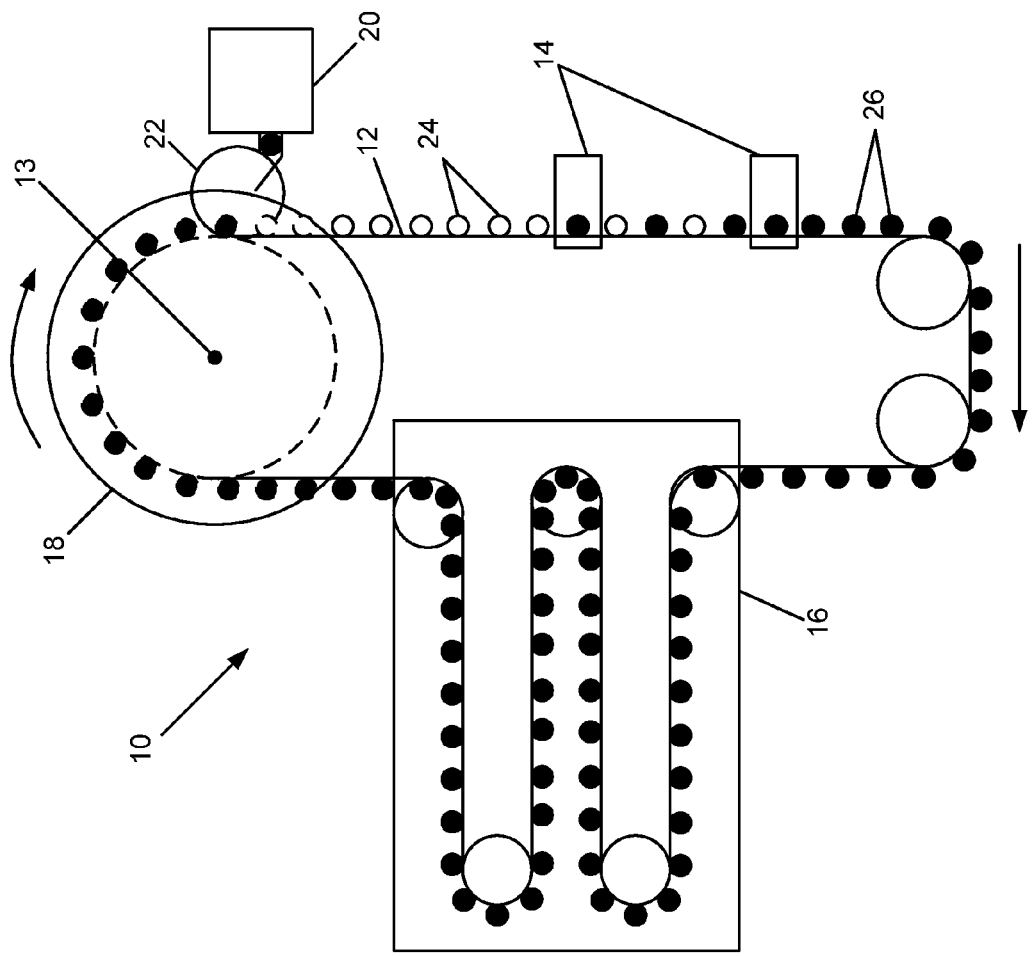
FIG. 3 is a schematic, illustrating a billet thermoforming system in accordance with an embodiment of the present invention.

The present application provides a billet thermoforming system and methods for producing a container or other article from a billet. The thermoforming system receives a feed of pre-cut billets and converts each billet into a container or article. The term "container" as used herein generally refers to a vessel or portion thereof having a thermoformed cavity. The container may be the top, bottom, or other portion of the finished vessel.

Containers may be produced using the described billet thermoforming system and method possessing good performance qualities, such as consistent cavity-to-cavity clarity or aesthetic appearance, barrier performance and the like, with a low rate of defect. Furthermore, the described billet thermoforming system and method may allow for 100% inspection of the formed containers so that defective containers may be diverted prior to filling.

A. Billet Production

Billets for use with the billet thermoforming system may be produced by various methods. In some embodiments, the billets are produced by feeding a thermoformable polymeric sheet through a cutting tool. The polymeric sheet may comprise any material suitable for thermoforming. In some embodiments, the polymeric sheet may be a laminate structure comprising layers of different materials. In an exemplary embodiment, a laminate sheet is provided comprising two layers of a polyolefin resin based film, such as polypropylene, and an intermediate layer of ethylene-vinyl alcohol copolymer between the polyolefin films. Other intermediate layers may be used in addition to or as a substitute for ethylene-vinyl alcohol to provide enhanced gas barrier properties to the container. Various methods are known for producing a multi-layered film. For example, the multi-layered film may be produced by coextrusion or by lamination of previously extruded layers.

An exemplary cutting pattern is illustrated in FIG. 2. In this embodiment, billets are cut from the sheet 9 in a pattern such that each interior billet is adjacent to six other billets. Such a cut pattern allows about 80% of the sheet 9 to be converted into billets. The small amount of material remaining after the billets are cut from the sheet 9 may be easily recycled.

Alternatively, billets may be formed by injection molding. For example, polymer resin or resins of different polymers may be injected or coinjected into a mold cavity forming the shape of the billet. Utilizing such a method, billets may be produced without generating any waste.

B. Billet Thermoforming System

The billet thermoforming system generally converts each billet into a container for filling. The billet thermoforming system may be maintained in various locations. Advantageously, the thermoforming system may be located at a location remote to where the billets are produced. In certain embodiments, the billet thermoforming system may be maintained at or near a site where the containers formed from the billets are filled.

In some embodiments, the billet thermoforming system may comprise a billet loader configured to load billets on a conveyor. The conveyor may include billet carriers that secure the billets to the conveyor. The conveyor may be configured to transport the billets through a heating apparatus that has one or more heating elements. The conveyor may then transport the billets, such as in a single lane series, to a thermoformer where each billet is formed into a container. Each of the formed containers may then be inspected for defects by an inspection system and either discharged from the thermoforming system for filling if the container passes inspection or rejected if a defect is detected.

In some embodiments, the conveyor and thermoformer operate in constant, continuous motion. In other embodiments, the conveyor and thermoformer may operate with an indexed stop-and-go motion. The conveyor and thermoformer may be mechanically linked so as to ensure proper alignment of the billets and the former tool as will be described in greater detail subsequently.

In one embodiment, the thermoforming system may comprise a single-lane heating apparatus having one or more radiant heating elements, a single-lane rotary billet thermoformer configured to form each of a plurality of billets into an article while rotating continuously, a discharge system adapted to evacuate each article from the billet thermoformer, and a rotary inspection system configured to inspect each article evacuated from the billet thermoformer for the presence of a defect. One or more conveyors may be provided to transport the plurality of billets through the heating apparatus as a single-lane series along a billet transport path and from the heating apparatus to the billet thermoformer, and a billet loader may be provided to load each of the plurality of billets on at least one of the one or more conveyors. In other embodiments, the billets may be transported in multi-lane series through a heating apparatus and/or a billet thermoformer.

Methods of producing a thermoformed article from a billet are also provided. In some embodiments, the method may comprise loading a plurality of billets as a series of single billets in a single lane on a conveyor, transporting the plurality of billets through a heating apparatus on the conveyor, and thermoforming each of the plurality of billets in a thermoformer after the billet is heated in the heating apparatus to produce a thermoformed article. In certain embodiments, the loading step may comprise placing each of the plurality of billets in a billet carrier. In some embodiments, the method may further include tamping each billet such that the billet is seated in a billet-retaining groove on the billet carrier. In certain embodiments, the thermoforming step may comprise transporting the billet around an axis of rotation of the thermoformer. Also, in certain embodiments, a form mold of the thermoformer engages one of the billet carriers during the thermoforming step. In some embodiments, the method may further include the step of automatically inspecting each of the articles produced by the thermoformer for the presence of a defect.

A billet thermoforming system 10 in accordance with an embodiment of the present invention is illustrated in FIG. 3. The billet thermoforming system 10 may include a continuous conveyor 12 with a plurality of billet carrying devices 24 attached thereto. The billet carrying devices 24 may be billet carrier rings or other structures which allow the billets to be carried on the conveyor 12.

The conveyor 12 may pass through one or more billet loading stations 14 where the billets 26 are placed onto the billet carrying devices 24. Depending on the linear speed of the conveyor 12, the distance between the billet carrying devices 24, and the operation speed of the billet loading station 14, it may be necessary to utilize multiple billet loading stations 14 operating in series or parallel. For example, as illustrated in FIG. 3, two billet loading stations 14 may be placed in series, and each billet loading station 14 may place a billet 26 on alternating billet carrying devices 24 (e.g., a first billet loading station 14 may load even-numbered billet carrying devices 24 and a second billet loading station 14 may load odd-numbered billet carrying devices 24). However, any number of billet loading stations 14 may be used.

The conveyor 12 transports the billets 26 from the billet loading station 14 through a heating apparatus, such as an oven 16, where the billets are heated to a pre-designated temperature. The billets 26 may be heated to a temperature suitable for solid-state thermoforming or to a temperature suitable for melt-phase thermoforming.

From the oven 16, the conveyor 12 transports the billets 26 to a billet thermoformer 18 where the billets are formed into containers or other articles. The formed containers or articles may then be released from the billet thermoformer 18 onto a discharge tray 22 of a discharge system 20. The discharge system 20 may feed the formed containers to an inspection system where the containers are analyzed for defects as will be described in greater detail subsequently. The conveyor 12 may then transport the empty billet carrying devices 24 back to the billet loading stations 14 as part of a continuous load-heat-form-discharge process.

Advantageously, the billet thermoforming system 10 of FIG. 3 may operate at a speed sufficient to produce a commercial throughput of at least about 450 or at least about 500 containers per minute, or between about 450 and about 1100 or between about 500 and about 550 containers per minute. The billet thermoforming system 10 may produce this commercial throughput while occupying a sufficiently small ground footprint to allow placement and operation the billet thermoforming system 10 at a site where the containers produced by the billet thermoforming system 10 are filled.

Conveyor

The term "conveyor" as used herein generally refers to any device suitable for mechanically transporting a series of billets from one location to another including, but not limited to, belt conveyors, chain conveyors and rollers.

In some embodiments, a continuous chain-type conveyor is used. The continuous conveyor may follow a path from a billet loader to a billet heating apparatus to a billet thermoformer and back to the billet loader, such as is illustrated in FIG. 3. The conveyor may operate at a continuous and constant linear speed so that billets are transported from the billet loader to the billet heating apparatus and to the billet thermoformer. In some embodiments, the conveyor may travel at a linear speed of at least about 3.5 or about 3.5 to about 6.0 feet per second. In certain embodiments, the conveyor may travel at a linear speed of about 4.3 feet per second.

In other embodiments, the conveyor may operate at with an indexed stop-and-go motion such that the conveyor travels a pre-designated distance between rest points. The distance traveled between rest points may be the same as the distance between adjacent billet carrying devices or a multiple of the distance between adjacent billet carrying devices.

The conveyor may be mechanically linked to the thermoforming apparatus such that the conveyor and thermoforming apparatus operate in unison. For example, if a continuous chain-type conveyor is used, the chain may link with teeth on a gear of the billet thermoformer. One or more motors may be employed to drive the conveyor and thermoformer via a drive gear or other mechanical linkage. In one embodiment, a motor may be employed to rotate the thermoformer, and the rotation of the thermoformer may drive the conveyor via a gear or other linkage.

Billet Carrier

Billet transport apparatuses and carrying devices are provided for transporting a billet on a conveyor. Advantageously, the billet carrier may also be operable for engaging with the thermoforming apparatus such that the billet remains attached within the billet carrier until the container is formed and removed from the billet carrier.

In some embodiments, each billet may be attached to the conveyor by a billet carrier. The billet carrier may be permanently or releasably attached to the conveyor and may suspend the billet horizontally away from the conveyor. In some embodiments, the billet is retained in the billet carrier in such a way that the major surfaces of the billet (e.g., the top and bottom surfaces of the billet) of the billet are substantially entirely exposed allowing radiant heat exposure to both major surfaces of the billet as the billet passes through an oven. The term "substantially entirely exposed," as used herein when referencing a major surface of a billet in a billet carrier, means that no more than about 20% of the referenced surface or about 0 to about 5 mm of the referenced surface, measured from the perimeter of the referenced surface to the center of the billet, is covered by the billet carrier.

In some embodiments, no more than about 5% of each of the major surfaces of the billet, and even more preferably, no more than about 1% of each of the major surfaces of the billet is covered by the billet carrier. In some embodiments, no more than about 1 mm of each major billet surface, measured from the perimeter of the billet surface to the center of the billet is covered by the billet carrier. The term "essentially entirely exposed," as used herein when referencing a surface of a billet in a billet carrier, means that no more than about 1% of each of the major surfaces of the billet or no more than about 1 mm of each major billet surface, measured from the perimeter of the billet surface to the center of the billet, is covered by the billet carrier.

In some embodiments, the billet transport apparatus may be an assembly comprising an outer carrier element and a billet-contacting inner portion, being configured to receive a billet, moveably situated within the outer carrier portion. According to an embodiment, a spring, such as a wave spring, may be provided between the outer carrier portion and the billet-contacting inner portion to allow resisted and restricted movement of the inner portion within the outer carrier portion.

In some embodiments, the billet-contacting inner portion has an inner wall that surrounds a billet-receiving cavity. The inner wall may have at least one narrow portion and the billet-receiving cavity may have a cross-cavity width extending between opposite sides of the inner wall (across the cavity), that is less than the width of the major surface of the thermoformable billet. In some embodiments, a billet-retaining groove may be situated within the narrow portion. The billet-receiving cavity may have a width, measured across the inner wall from within the billet-retaining groove, that is less than the major surface of the thermoformable billet. In such an embodiment, the billet may form a dome when seated in the billet-retaining groove.

In some embodiments, the inner wall may comprise an internal flange that extends inwardly into the billet-receiving cavity from the inner wall. In other embodiments, the inner wall may be flangeless, such that the cross-cavity width of the billet-receiving cavity measured from opposite sides of the inner wall between the billet-retaining groove and the top of the billet carrier adjacent to the billet retaining groove is substantially the same as the cross-cavity width of the billet-receiving cavity measured from opposite sides of the inner wall between the billet-retaining groove and the bottom of the billet carrier adjacent to the billet retaining groove.

Although the examples depicted and described herein primarily pertain to billet carriers for transporting circular billets, the billet-contacting inner portion may be formed into other shapes to accommodate billets of various geometries. For example, the billet-contacting inner portion may have an inner wall perimeter formed in any polygonal, curvilinear or hybrid polygonal-curvilinear shape, including, but not limited to, triangular, quadrilateral, rectangular, square, trapezoidal, rhomboidal, pentagonal, hexagonal, heptagonal, octagonal, nonagonal, decagonal, circular, oval, elliptical, Reuleaux polygonal, or combination of any number of the foregoing. Moreover, the shape may comprise one or more other features such as a fillet or a chamfer.

In some embodiments, the billet carrier assembly comprises an arm configured to allow the billet-contacting inner portion of the billet carrier to extend away from conveyor when attached. This feature may prevent the conveyor from interfering with the transfer of heat from radiant heaters to the top and bottom surface of the billet when passing through the heating apparatus. This feature also allows the billet carrier to engage a form mold of the thermoformer when forming the container.

Figure 4:
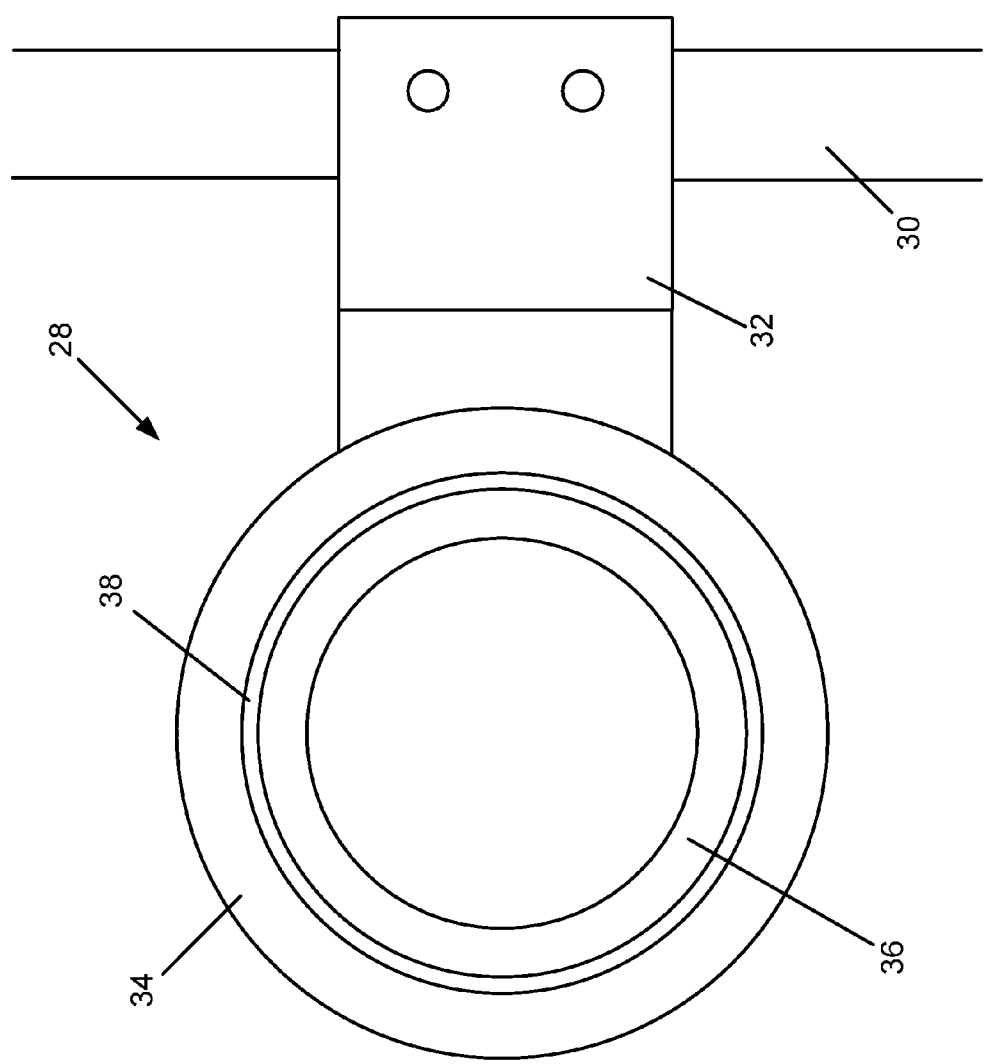
FIG. 4 is a plan view, illustrating a carrier ring assembly for use in a billet thermoforming system in accordance with an embodiment of the present invention.

One embodiment of a billet carrier is illustrated in FIG. 4. A carrier ring assembly 28 includes an outer carrier ring 34 that is attached to the conveyor 30 by an arm 32 such that the carrier ring 34 extends away from the conveyor 30. An inner billet ring 36 is situated within the outer carrier ring 34 and is retained in place by a snap ring 38. The inner billet ring 36 has an inner wall having a circular-shaped perimeter surrounding a billet-receiving cavity 33 for receiving a circular billet. The billet-receiving cavity 33 has cross-cavity width ($W_{cc}$) measured from opposite sides of the inner wall of the billet-receiving cavity 33 that is dimensioned to receive the billet. In some embodiments, the cavity 33 has a portion having a $W_{cc}$ that is less than the width of the billet. The inner wall may have various profiles.

One embodiment of a billet carrier is illustrated in greater detail in FIG. 5. A carrier ring assembly 40 is attached to a conveyor 48 via an arm 46. A billet ring 44 is situated within the carrier ring 42. The movement of the billet ring 44 within the carrier ring 42 is restricted by an exterior flange 62 of the billet ring 44 which contacts a snap ring 52 on its top surface and a wave spring 50 on its bottom surface. The wave spring 50 provides resistance against the downward motion of the billet ring within the carrier ring 42. As illustrated in FIG. 6, when a force is applied to the top of the billet ring 44 that exceeds the resistive force exerted by the wave spring 50, the billet ring 44 compresses wave spring 50. The billet ring 44 remains retained within the carrier ring 42. This feature allows the billet ring 44 to have a limited range of movement when the billet ring 44 engages the billet thermoformer form mold and isolates the movement of the billet ring 44 from the conveyor 48.

In the embodiment of FIG. 5, the billet ring 44 has an inner wall extending from the top of the billet ring 44 to the bottom 58 of the billet ring. The top portion of the inner wall has a tapered, conical surface 54. The tapered surface 54 assists in guiding the form mold of the thermoformer into alignment over the billet. The bottom portion of the inner wall has a cylindrical surface 56 which extends from the tapered surface 54 to the bottom 58 of the billet ring 44. A billet-retaining groove 60 is provided in the cylindrical surface 56 proximal the bottom 58. The cylindrical surface 56 may define a billet receiving cavity having a width or inner diameter that is smaller than that the width or diameter of the billet. This prevents the billet from inadvertently falling out of the billet ring 44.

Another embodiment of a billet carrier is illustrated in FIG. 7. Similar to the billet ring 44 of FIG. 5, the billet ring 65 of FIG. 7 has an inner wall extending from the top of the billet ring 65 to the bottom 66. The top portion of the inner wall has a tapered, conical surface 67. The bottom portion includes an internal flange or a ledge 68 which extends inward from the inner wall proximal the bottom 66. A channel 70 may also be provided above the ledge 68. In this embodiment, the ledge 68 may support the billet from the bottom and the channel 70 provides space to accommodate thermal expansion of the billet as it is heated.

In other embodiments, an insulator may be placed on or applied to the top surface of the ledge 68. For example a low thermal conductivity washer may be placed on or attached to the top surface of the ledge 68. In other embodiments, a material having a low thermal conductivity may be applied to the top of the ledge 78 as a coating.

The components of the billet carrier may be produced from various materials, including, but not limited to, aluminum, steel and titanium alloys. In some embodiments, the billet-contacting inner portion and the outer portion of the billet carrier may further comprise a black oxide coating or other flat or dark heat resistant coating to improve thermal performance.

FIGS. 13-15 illustrate a billet seating sequence in which the tamping device of FIGS. 11-12 is employed to seat a billet in the carrier ring assembly 40 of FIG. 5. As illustrated in FIG. 13, the outer billet contacting members 114 and the inner billet contacting member 118 approach the billet ring 44 and the unseated billet 122 as the billet carrier assembly 40 approaches the tamping station. When the billet carrier assembly 40 is directly aligned under the outer billet contacting members 114 and above the inner billet contacting member 118, the outer billet contacting members 114 contact the unseated billet 122 and press the unseated billet 122 into the billet-retaining groove 60.

Simultaneously with or after the billet 122 is seated into the billet-retaining groove 60, the inner billet contacting member 118 contacts the billet 122 at or near the center of the billet 122. Because the width of the billet receiving cavity measured across the cavity from within the billet-retaining groove 60 is smaller than the diameter of the unseated billet 122 in this example, the seated billet 124 will dome in the center and have a downward-facing concave surface 130 as the billet carrier assembly 40 is transported away from the tamping station by the conveyor 48 as illustrated in FIG. 15.

Figure 18:
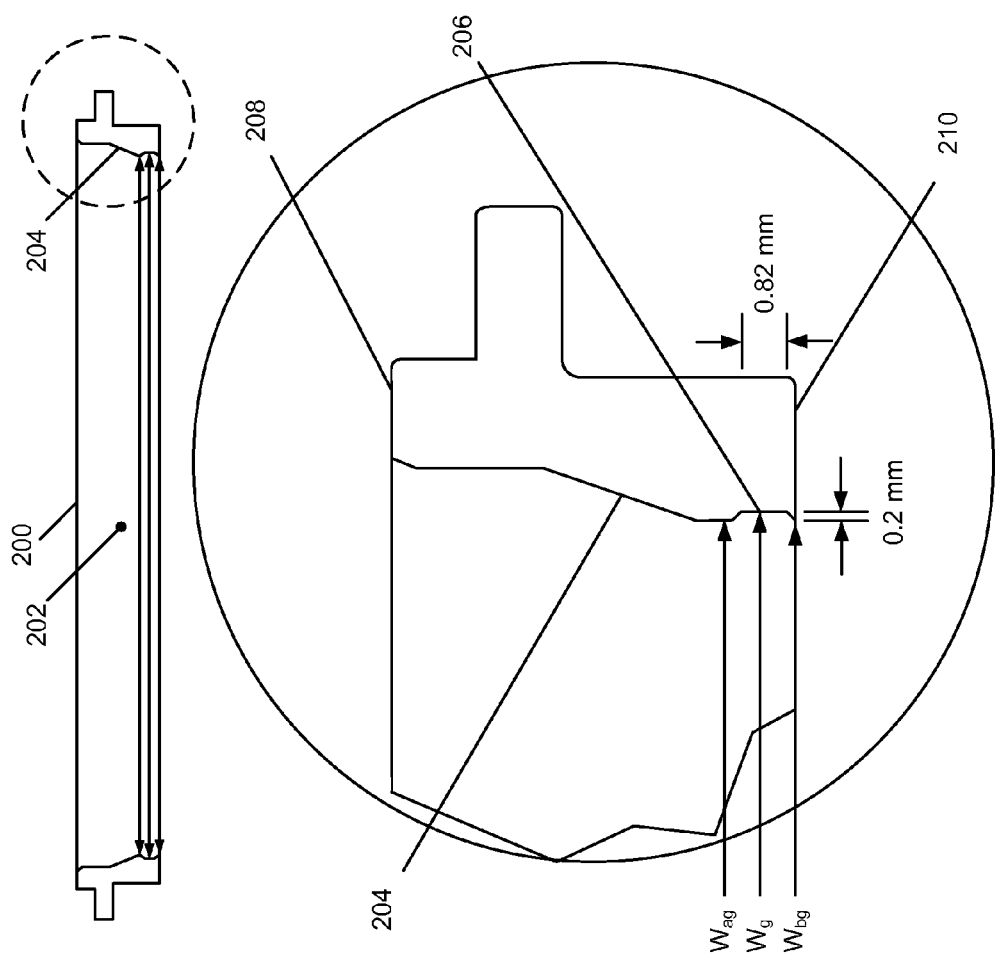
FIG. 18 is a section view, illustrating an inner wall profile of a billet carrier in accordance with an embodiment of the present invention.

A detailed view of a billet carrier is provided in FIG. 18. The billet carrier 200 has a top 208, a bottom 210 and an inner wall 204 extending between the top 208 and bottom 210 around a billet-receiving cavity 202. The cavity 202 may be bound and defined along its side by the inner wall 204, and may extend from the top 208 of the billet carrier 200 to the bottom of the billet carrier 210. The inner wall 204 includes a billet-retaining groove 206 proximal to the bottom 210. In some embodiments, the billet-retaining groove 206 may have sloped or curved sidewalls.

In an exemplary embodiment, a billet situated within a billet carrier may have top and bottom surfaces that are essentially entirely exposed. The depth of the billet-retaining groove 206, measured relative to portions of the inner wall 204 adjacent to the billet-retaining groove 206, may be about 0.2 mm. The height of the billet-retaining groove 206 may be about 0.82 mm. The cross-cavity width ($W_g$), measured from opposite sides of the inner wall 204 across the cavity 202 from within the billet-retaining groove 206 may be about 81.8 mm. The cross-cavity width measured from opposite sides of the inner wall 204 above and below the billet-retaining groove 210 adjacent to the billet-retaining groove 210 ($W_{ag}$ and $W_{bg}$, respectively) may each be about 81.4 mm. A billet having a width greater than Wg may be seated within the billet-retaining groove 210 such that the billet forms a dome having a convex surface facing a pre-designated direction (for example, upward). In such an example, no more than about 0.2 mm of the billet surface measured from the center of the billet to the perimeter of the billet would be covered by the billet carrier 200. Moreover, no more than about 1% of the surface of the billet would be covered by the billet carrier 200.

In some embodiments, no more than about 1 mm of the billet surface measured from the center of the billet to the perimeter of the billet would be covered by the billet carrier 200, or no more than about 0.5 mm of the billet surface measured from the center of the billet to the perimeter of the billet would be covered by the billet carrier 200, or no more than about 0.2 mm of the billet surface measured from the center of the billet to the perimeter of the billet would be covered by the billet carrier 200.

Billet Loader

Billet loading stations may be provided for placing individual billets on the conveyor. Each billet loading station may have one or more billet loading devices. Each billet loading device may be adapted to place individual billets onto the conveyor or into a billet carrier in series as the conveyor or billet carrier passes through the billet loading station for a continuous-motion conveyor or during a rest period when the conveyor or billet carrier is stationary at the billet loading station for an indexed-motion conveyor.

Figure 10:
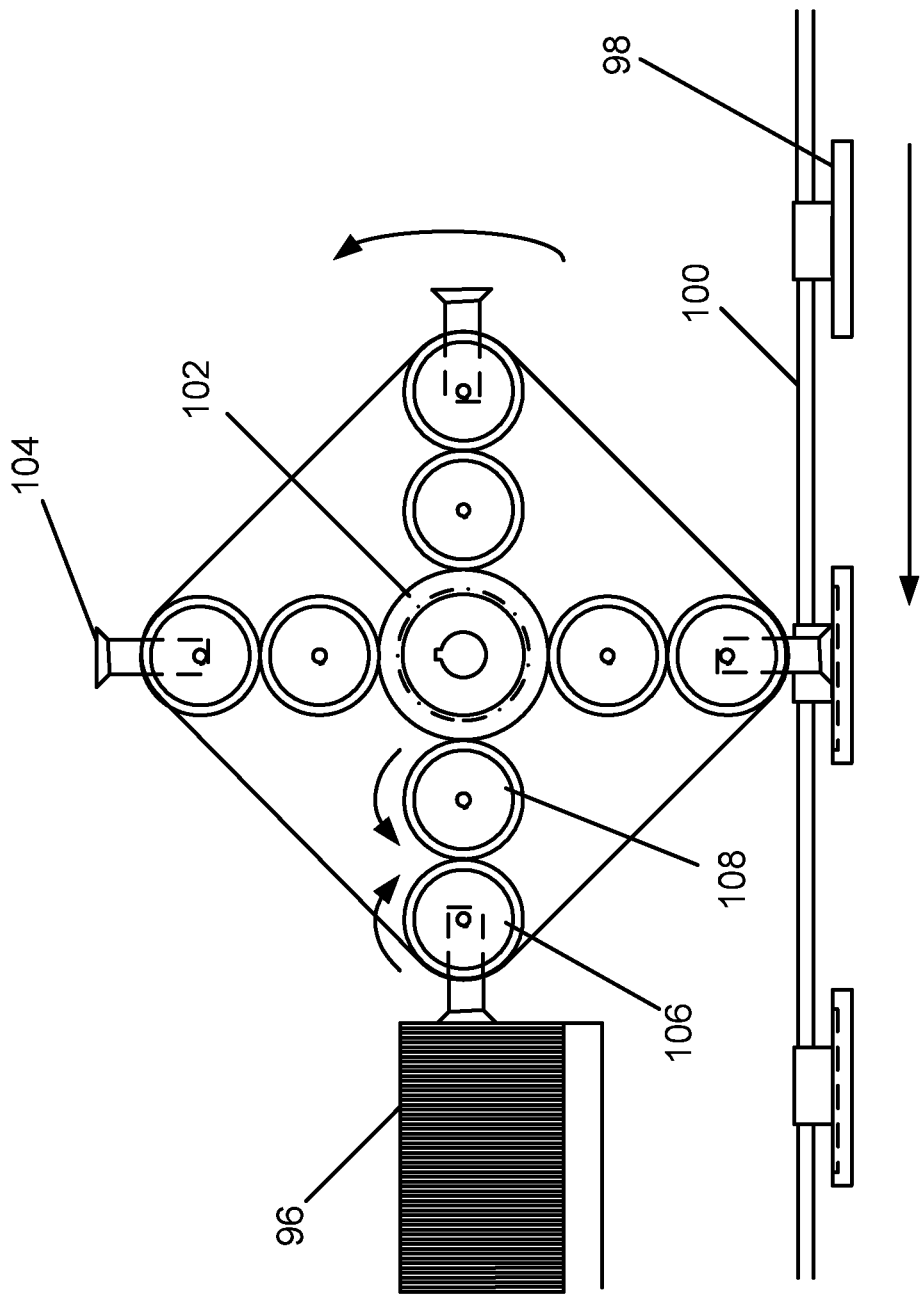
FIG. 10 is an elevation view, illustrating a billet loader for use in a billet thermoforming system in accordance with an embodiment of the present invention.

One embodiment of a billet loader is illustrated in FIG. 10. The billet loader 10 may be a rotary picker device or any other machine suitable for removing a billet from a billet magazine 96 and placing the billet onto a conveyor 100 or a billet carrier 98 attached to the conveyor 100. In the example of FIG. 10, a rotary picker type device is illustrated. In this example, a stationary gear 102 may be provided at the center of the billet loading 94. A billet attachment element 104 may be mechanically linked to each of four outer planetary gears 106. An inner planetary gear 108 may be provided between each outer planetary gear 106 and the central stationary gear 102.

As the billet loader 94 rotates (counterclockwise from the perspective of the viewer of FIG. 10), the inner planetary gear 108 rotates (counterclockwise) about the stationary gear 102. The outer planetary gear 106, being in mesh with the inner planetary gear 108, rotates (clockwise) causing the billet attachment element 104 to rotate therewith. When the billet attachment element 104 contacts a billet at the end of the billet magazine 96, the billet attachment element 104 releasably attaches to the billet and separates the billet from the billet magazine 96. The billet loader 94 may then rotates a quarter of a rotation (counterclockwise) and place the billet in the billet carrier 98 as the billet carrier 98 arrives at a loading position.

It should be appreciated that various attachment features may be provided on billet attachment element 104 to facilitate releasable attachment of the billet to the billet attachment element 104. For example, each billet attachment element 104 may comprise a suction cup, releasable adhesive, and/or a vacuum nozzle.

Various other billet loading systems may also be used. For example, one or more pick-and-place robots may be employed to load billets on the conveyor 100 or the billet carrier 98.

In some embodiments, a tamping device may be employed to seat the billet in the billet carrier. The tamping device may be provided at the billet loading station or between the billet loading station and the oven. In some embodiments, the tamping device may also be employed to seat each of the thermoformable billets in the billet-retaining groove such that a dome is formed having a convex surface facing in the same pre-designated direction. For example, for an upside-down form mold, the tamping device may cause the billet to dome in such a way that a convex surface faces up (i.e., the billet may have a downward facing concavity).

As illustrated in FIG. 11, the tamping device 110 may comprise a top portion having one or more outer billet contacting members 114 and a bottom portion comprising at least one inner billet contacting member 118. The outer billet contacting members 114 and inner billet contacting member 118 may be translated between a tamping position (illustrated in FIG. 11) and a released position (illustrated in FIG. 12) via an actuator 112 and an actuator 116. The actuators 112 and 116 may be mechanically linked to operate in unison, or they may operate independently.

As illustrated in FIG. 11, the top portion of the tamping device 110 may be translated down and the bottom portion of tamping device 110 may be translated up to contact and seat an unseated billet 122 within the billet carrier 126 when the billet carrier 126 is transported between through the tamping device 110 by the conveyor 120. The outer billet contacting members 114 may contact the billet near the perimeter of the billet to seat the billet in the billet carrier 126. The inner billet contacting member 118 may simultaneously or subsequently contact the billet near the center of the billet to cause the billet to form a dome shape having a downward facing concave surface within the billet carrier 126.

The upper and lower portions of the tamping device 110 are then translated away from the billet carrier 126 as the conveyor 120 transports the seated billet 124 in the billet carrier 126 to an oven for heating. It has been discovered that a billet having a dome with a downward-facing cavity yields a consistently higher quality container when used with an upside-down form molding tool than a flat billet or a billet having a dome with an upward-facing concavity. Accordingly, in other embodiments, the billet may be pre-curled to naturally form a dome in the desired orientation when placed or seated in the billet carrier 126 without requiring an additional inner billet contacting member 118 to form the concavity.

A pre-inspection system may be provided to determine whether the billet is properly seated in the billet carrier before the billet is transported through the heating apparatus. If improper seating is detected, the pre-inspection system may eject the billet from the billet carrier before the billet carrier passes through the heating apparatus and thermoformer to reduce the occurrence of defects.

Heating Apparatus

A heating apparatus may be provided for pre-heating the billets before the billets are transported to the thermoformer. Advantageously, the billets may pass through the heating apparatus in a single-lane along a billet transport path (as a single-lane series of billets) to reduce heating inconsistencies between the billets. In such a configuration, each billet may be exposed to substantially identical heating conditions as the billet passes through the heating apparatus, improving the consistency and quality of containers and other articles formed from the billets. In other embodiments, the billets may be transported through the heating apparatus in a multi-lane series.

Figure 8:
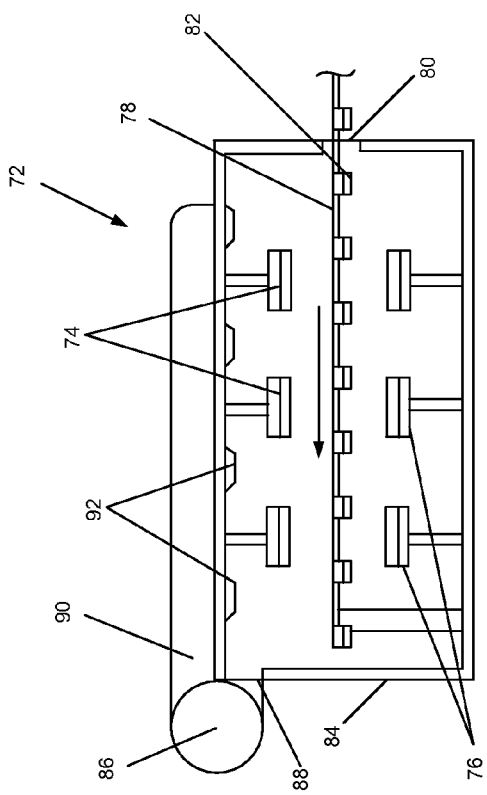
FIG. 8 is a sectioned elevation view, illustrating an oven for use in a billet thermoforming system in accordance with an embodiment of the present invention.
Figure 9:
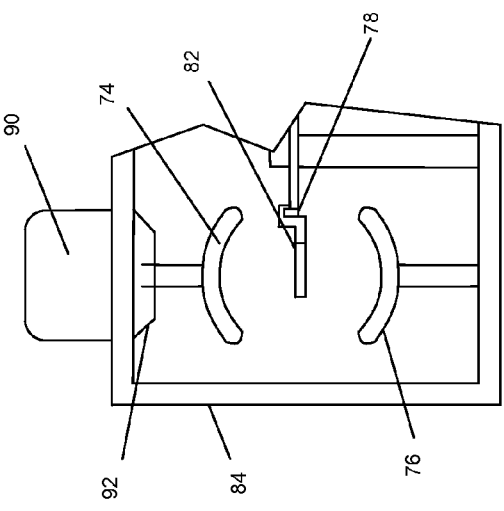
FIG. 9 is a sectioned elevation view, illustrating a portion of the oven of FIG. 8.

One embodiment of a heating apparatus is illustrated in FIGS. 8 and 9. An oven 72 may be provided having a plurality of radiant heaters 74, 76 therein. The radiant heaters 74 and 76 may comprise various types of ceramic heaters. For example, the radiant heaters may comprise ceramic heaters and/or tungsten filament heaters.

The oven 72 may include an entrance port 80 in the oven housing 84 through which the conveyor 78 transports a series of billets through the oven in billet carriers 82. The oven 72 may also include an exit port (not shown) in the oven housing 84 through which the conveyor 78 transports the billets out of the oven 72 to an thermoforming apparatus. While being transported through the oven 72, the billets may pass between a plurality of top radiant heaters 74 and bottom radiant heaters 76. In some embodiments, the conveyor 78 may transport the billets through the oven 72 in a snake like pattern (such as illustrated in FIG. 3) such that the billets pass between one or more different radiant heaters with each directional pass through the oven housing 84. The snake pattern illustrated in FIG. 3 advantageously reduces the length of the oven required to heat the billets to a pre-designated exit temperature, thereby reducing the floor space required for the heating apparatus.

The heating apparatus may further comprise a hot air circuit for providing auxiliary convective heating. As illustrated in FIG. 8, a blower intake 88 may be provided in the oven housing 84 for receiving hot air within the oven housing 84. A blower 86 may provided for recirculating the hot air back into the oven vie a hot air duct 90 and one or more hot air nozzles 92. The precise design, placement and configuration of the hot air nozzles 92 may be optimized for the thermal conditions of the oven 72. Additional thermal energy may be added to the hot air circuit by providing resistive heating elements in the hot air duct 90 or by providing an independent source of hot air. The introduction of hot air currents convectively heats each of the billets as each of the billets is transported through the housing and advantageously reduces the length of time the billets must remain in the oven 72 to reach the pre-designated exit temperature, thereby reducing the floor space required for the heating apparatus. The oven housing 84 may substantially completely encase the radiant heaters 74, 76 and the conveyor 78 and billet carriers 82 as the billets pan through the oven 72 so that the flow of air in and out of the oven is controlled and heating conditions in the oven remain substantially uniform and effective.

The billet thermoforming system may further include one or more temperature measuring devices, such as infrared cameras, before and/or after the heating apparatus to measure the temperature of the entering and/or exiting billets or to otherwise analyze the temperature profile of the billet. In some embodiments, a controller may be provided to adjust the current supplied to the radiant heaters based on measured temperature or temperature profile of billet.

In some embodiments, the heating apparatus may heat the billets such that a temperature differential of about 3° C. or less is measured within the billet (i.e., from perimeter to center, from the top surface to bottom surface, or from the top or bottom surface to the center of the billet). Moreover, the heating apparatus may heat the billets such that there is a temperature difference of about 2° C. or less, or more preferably about 1° C. between different billets exiting the heating apparatus.

The precise temperature to which a billet may need to be heated may vary depending upon the composition and size of the billet, the length of time it takes for a billet to travel between the heating apparatus to the forming stage of the thermoforming tool, and the nature of the thermoforming process. In certain solid-state thermoforming embodiments, the billets may be heated to an average temperature of about 158° C.

In some embodiments, an additional heating apparatus may be provided for preheating the billet carrier. In certain embodiments, the billet carrier may be pre-heated immediately before billets are loaded into the billet carrier or before the billet-loaded billet carrier is transported through the oven. Various heating apparatuses may be used to pre-heat the billet carrier. In some embodiments, the billet carrier may be heated by an inductive heating element and the billet carrier may comprise a material that may be heated via induction. Accordingly, in some embodiments, the billet carrier may comprise a material such as a magnetic stainless steel alloy. The inductive heating element may generate an oscillating electro-magnetic field and may inductively couple to the billet carrier to induce eddy currents in the material of the billet carrier and resistively heat the billet carrier. It has been found that pre-heating the billet carrier, such as with inductive heating, prior to heating the billet in the oven results in a more even temperature distribution in the billet. Other rotary billet thermoforming configurations are possible including, but not limited to, a right-side-up thermoforming configuration and radially-directed thermoforming.

Billet Thermoformer

A billet thermoformer may be provided for forming preheated billets into containers or other articles. In some embodiments, a single-lane rotary thermoformer may be provided that is configured to receive a feed of thermoformable billets from a conveyor and to form each of the thermoformable billets into an article while rotating continuously. In other embodiments, a multi-lane rotary thermoformer may be employed. In some embodiments, the thermoformer may have a rotating forming wheel and a plurality of form molds situated angularly about the axis of rotation of the forming wheel. Each molding form may be separated from adjacent molding forms by a distance that corresponds to the distance between adjacent billet carriers on the conveyor such that each billet carrier engages one of the molding forms as the conveyor passes around the billet thermoformer. As illustrated in FIG. 3, each form mold may be radially spaced from the axis of rotation of the forming wheel of the thermoformer such that each form mold is transported about the axis of rotation 13 as the thermoformer revolves. The thermoformer may be adapted to form a container or other article within the molding form as the billet thermoformer rotates.

In some embodiments, the plurality of form molds rotate in unison with rotating billet thermoformer. The form molds may be situated in an upside-down orientation such that the formed container is produced with a cavity facing in the downward direction. The billet thermoformer may include a plurality of plungers that are adapted to rotate in unison with the rotating forming wheel. Each plunger may correspond to one of the form molds such that when the plunger is actuated, it may extend through the billet carrier and press the heated billet into the form mold to form the desired shape. The billet thermoformer may be equipped with a pneumatic system, such as a vacuum or blower to complete the forming of the container from the billet in the mold. Each plunger may be actuated to travel in a direction that is parallel to the axis of rotation of the billet thermoformer. For form molds that are situated in an upside-down orientation, the plunger may be actuated to travel in an upward direction. In other embodiments, the form molds may be situated in the reverse direction such that the mold cavity faces upward and the plunger travels in a downward direction or the form molds may be situated so that the mold cavities faces outwardly and the plunger travels radially and substantially perpendicular to the axis of rotation of the rotary thermoformer.

In some embodiments, the billet thermoformer may be mechanically linked to the conveyor such that the billet thermoformer move together in unison. In certain embodiments, the conveyor engages a gear on the billet thermoformer and the conveyor passes around the rotational axis of the thermoformer at the same angular speed as the thermoformer. In other embodiments, the billet carrier may be transferred from the conveyor to the billet thermoformer and then transferred to the same or different conveyor after the container is formed in the thermoformer.

Methods are also provided for producing a thermoformed article from a billet. In some embodiments, the method may comprise providing a series of billet carriers each carrying an individual pre-heated billet and a thermoformer comprising a plurality of form molds each having a mold cavity, each form mold being configured to engage one of the billet carriers; sequentially engaging each of the series of billet carriers with one of the plurality of form molds; and thereafter sequentially forming a thermoformed article in the mold cavity of each form mold from each individual pre-heated billet. In certain embodiments, the method may further comprise transporting the billet carriers to the thermoformer on a conveyor. The plurality of form molds may be rotated continuously about an axis of rotation when forming the thermoformed articles.

Figure 16:
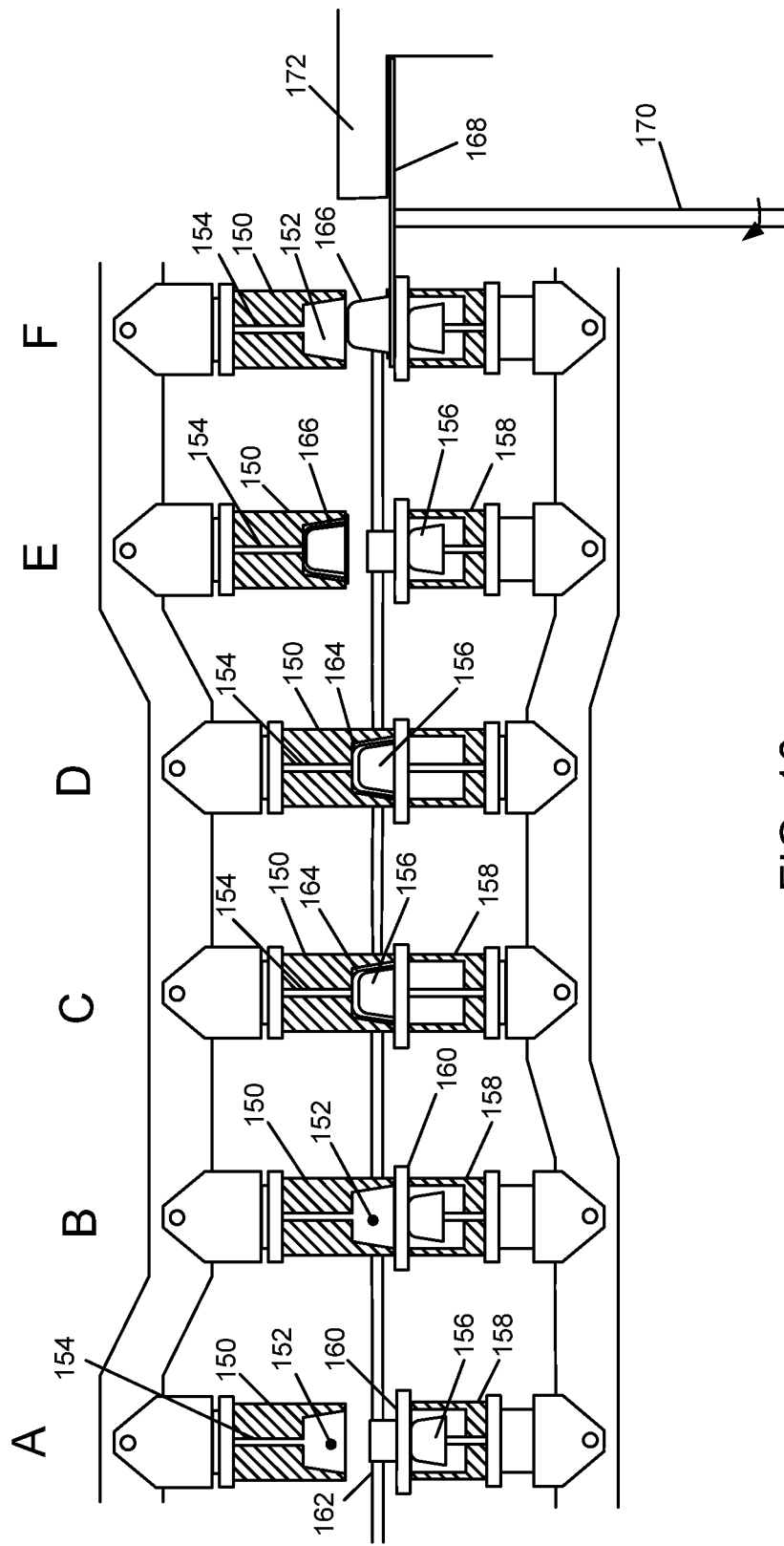
FIG. 16 is a schematic, illustrating an operation cycle for a rotary thermoformer of a billet thermoforming system in accordance with an embodiment of the present invention.

An operation cycle for a rotary billet thermoformer is illustrated in FIG. 16. In the present example, the operation cycle is depicted in six discrete stages A, B, C, D, E, and F. Each billet may pass through each of the stages as the billet travels with the forming mold around the rotational axis of the thermoformer. In some embodiments, the thermoformer comprises a plurality of forming molds. For example, the thermoformer may comprise 15 to 100 forming molds, or more preferably 20 to 50 forming molds. Accordingly, each of the stages depicted in FIG. 16 may occur simultaneously to one of the billets engaged with one of the molding forms of the thermoformer at a given time. Although the viewer may envisage that each of the stages depicts adjacent thermoforming molds of the rotary thermoformer, there may be one or more additional thermoforming molds at intermediate positions relative to the adjacently-depicted stages.

At stage A, the plunger housing 158 corresponding to the form mold 150 may engage the billet carrier 160 at its bottom surface. The form mold 150 may be positioned above the billet carrier 160 such that the cavity 152 of the form mold 150 is directly above the billet in the billet carrier 160. As the conveyor 162 and the form mold 150 rotate about the axis of rotation of the thermoformer, the form mold 150 is lowered to engage the top surface of the billet carrier 160 as depicted in stage B. Various mechanical or electro-mechanical devices may be employed to actuate the translational movement of the form mold 150, including various cam and follower systems and servo drives. In one embodiment, a follower attached to form mold 150 may engage a cam that remains in a stationary position as the form molds 150 rotates about the axis of rotation of the thermoformer.

As the billet carrier 160 and the form mold 150 continued to rotate, a plunger 156 is actuated to press the billet 164 into the cavity 152 of the form mold 150, as illustrated in stage C. As with the actuation of the movement of the form mold 150, various mechanical and electro-mechanical devices may be employed to actuate the translational movement of the plunger 156, including, but not limited to, a cam and follower system or a servo. A vacuum may be applied to vacuum channel 154 before, during and/or after actuation of the plunger 156. Auxiliary air may be injected into the cavity 152 of the form mold 150 from the plunger 156 or plunger housing 158 on the side of the billet 164 opposite of the vacuum channel 154. As depicted in stage D, the plunger 156 may be maintained in the actuated position and the vacuum may be maintained for a period of time sufficient to form a container from the billet 164.

After the container 166 is formed, the plunger 156 may translate to its original position within the plunger housing 158 and the form mold 150 may disengage and translate away from the top of billet carrier 160 as illustrated in stage E. The container 166 may be maintained in the cavity 152 of the form mold by vacuum applied through the vacuum channel 154 until the form mold 150 passes over the discharge tray 168. As illustrated in stage F, the form mold 150 may release the container 166 from the cavity 152 when it passes over the discharge tray 166. A shaft 170 may rotate the discharge tray 168 so that the container 166 is conveyed away from bottom of the form mold 150. A sweep arm 172 may thereafter direct the container 166 off of the rotating discharge tray 166 onto another conveyor or into a storage bin.

A detailed illustration of the engagement of a form mold and billet carrier is provided in FIGS. 19 and 20. As illustrated in FIG. 19, the carrier arm 222 may position the billet carrier 220 such that the cavity 218 of the billet carrier 220 and the billet contained therein are positioned above the plunger 226. The plunger housing 224 may have a sealing element 228, such as an elastomeric O-ring, for forming a seal between the billet carrier 220 and the plunger housing 224. The cavity 218 of the carrier 220 may also be aligned with a carrier engagement member 216 of the housing 212 containing the form mold 214. The carrier engagement member 216 may have a profile that substantially minors the profile of the cavity 218 of the billet carrier 220 such that the exterior surface of the carrier engagement member 216 may mate with the inner wall of the billet carrier 220, when the form mold engages the billet carrier 220 as illustrated in FIG. 20.

Discharge System

A discharge system may be provided for capturing formed containers or other articles formed by the billet thermoformer. In some embodiments, the discharge system may be configured to sequentially evacuate individual formed articles from the billet thermoformer. In some embodiments, formed containers are discharged onto discharge tray, such as a rotating discharge tray, from which they are conveyed to an inspection system. In some embodiments, discharge and inspection functionalities are provided by a combined discharge-inspection system in which containers are pulled from the form mold of the thermoformer by the discharge-inspection system and then analyzed for the presence of defects.

One embodiment of a discharge system is illustrated in FIG. 16. In this embodiment, the formed container 166 is released from the form mold 150 onto a rotating discharge tray 168. The container 166 may alternatively be released from the form mold 150 onto a chute or other device. Various mechanisms may be provided for releasing the container from the form mold 150. For example, in some embodiments, the container 166 may be released from the form mold 150 by the release of a vacuum force holding the container 166 within the cavity 152. In some embodiments, an air pulse may be provided, for example, via vacuum channel 154 to release the container 166 from the cavity 152. In some embodiments, the container 166 may be released from the form mold 150 by a sudden translational movement of the form mold 150.

The formed container 166 may also be separated from the form mold 150 by a mechanical device that releasably attaches to the formed container 166 and pulls the container 166 from the cavity 152. The mechanical device may then place the formed container 166 onto a conveyor or it may position the container 166 in front of an inspection camera as part of an inspection system.

Inspection System

An inspection system may be provided for analyzing containers formed by the billet thermoforming system for the presence of defects. Advantageously, the inspection system may analyze about 100% of the billets produced by the billet thermoforming system as part of the continuous operation of the billet thermoforming system. The inspection system may also be configured to inspect a representative sample (less than 100%) of the billets produced by the system. In certain embodiments, the system may be configured to inspect about 450 or at least about 500 containers per minute, or between about 450 and about 1100 or between about 500 and about 550 containers per minute.

In some embodiments, a rotary container positioning device may be used to releasably attach to each article and pass each of the article in front of one or more inspection cameras, such as a multiplexed charged-coupled device (CCD) cameras, that capture an image of the article. A computer may automatically analyze each image for the presence of defects using defect-detection algorithms. If a defect is detected, the container may be discharged as a reject. If no defect is detected, the container may be discharged to a conveyor or other location where containers that pass inspection are collected.

Figure 17:
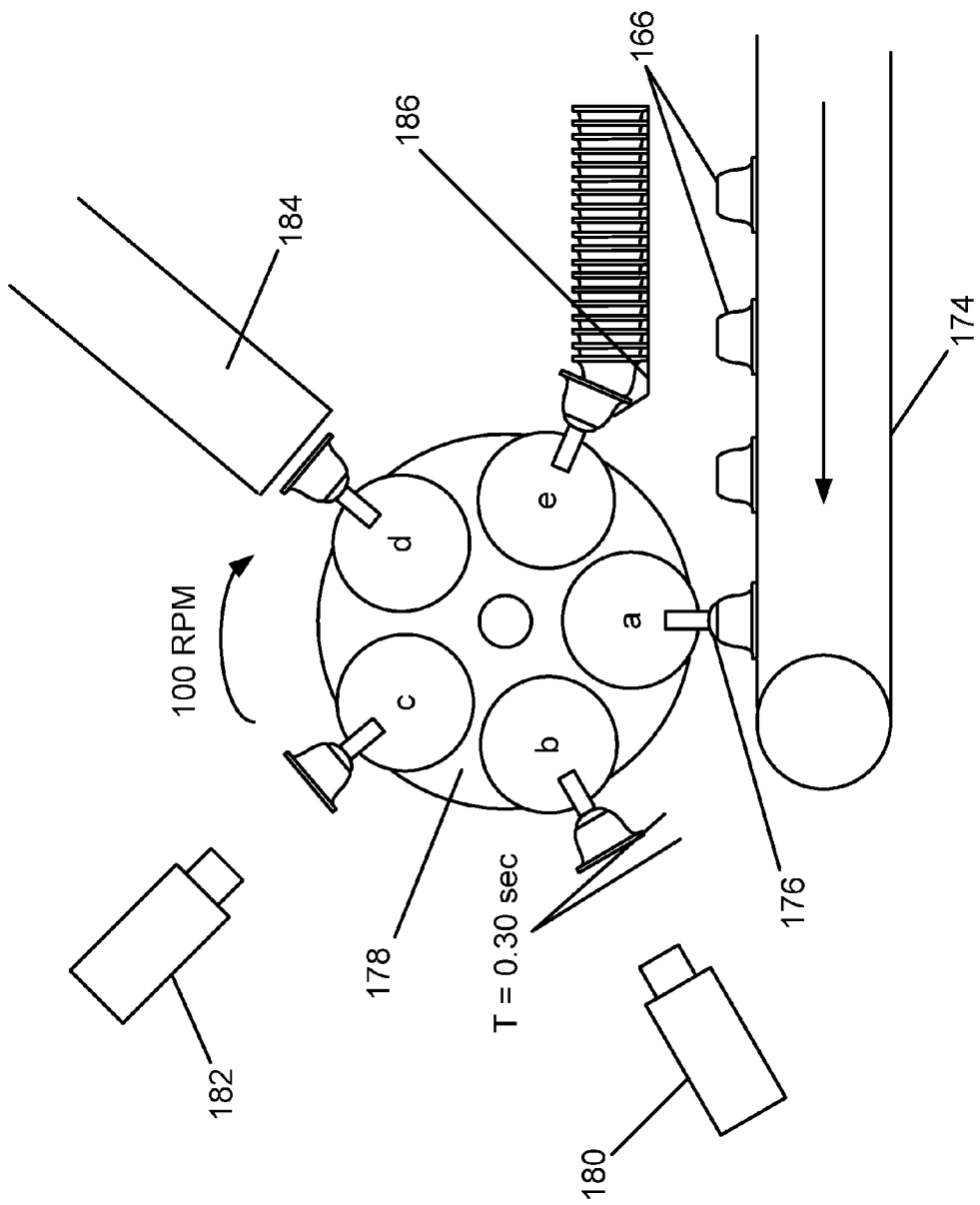
FIG. 17 is a schematic, illustrating an inspection system for a billet thermoforming system in accordance with an embodiment of the present invention.

One embodiment of a container inspection system is illustrated in FIG. 17. The formed containers 166 may be transported to the container inspection system via a conveyor 174. A container positioning device 178 has a plurality of container attachment elements 176 adapted to releasably attach to the formed containers 166. It should be appreciated that various attachment features may be provided on container attachment element 176 to facilitate releasable attachment of the container to the container attachment element 176. For example, each container attachment element 176 may comprise a suction cup, releasable adhesive, and/or a vacuum nozzle.

In the present example, a five-position container positioning device is depicted having five container attachment elements 176. Each of the positions are depicted in FIG. 17 as positions a, b, c, d and e. At position a, the container attachment element 176 attaches to one of the formed containers 166 on the conveyor 174. The container positioning device 78 may then rotate the container 166 in front of inspection cameras 180 and 182 at positions b and c, respectively.

Each inspection camera 180, 182 may capture an image of the container 166. For example, the inspection cameras 180, 182 may be charged-coupled device (CCD) cameras. A computer may analyze each image for the presence of defects using a defect-detection algorithm. Other analyzing tools may be used in addition to or in place of the camera inspection system. For example, the three-dimensional profile of the container may be scanned or measured with a laser or other device. The observed three-dimensional profile may be compared with a pre-designated profile.

If the computer determines that the container has a defect, the container may be released at position d into a reject chute 180, onto a reject conveyor or into a reject container. If no defect is detected or the container passes inspection, the container may be released onto or into a container collector 186 at position e with other containers that pass inspection.

In some embodiments, the container positioning device 178 rotates at about 100 rpm. This rotational speed may allow a time window of about 0.30 seconds in which the container 166 is essentially stationary in front of each inspection camera 180 and 182, allowing an analyzable-quality image of the container 166 to be captured. During this period of time in which the container is essentially stationary in front of each inspection camera 180 and 182, the container 166 may have essentially no linear motion relative to the inspection camera 180, 182 although the container positioning device 178 may be rotating continuously.

It will be appreciated that various of the above-disclosed and other feature and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A billet carrier assembly for transporting billets on a conveyor comprising:
   an outer carrier portion; and
   a billet-contacting inner portion attached to and situated within the outer carrier portion, the billet contacting inner portion adapted to contain a thermoformable billet having a major surface, the billet-contacting inner portion comprising a top, a bottom, an inner wall extending from the top to the bottom, and a billet-retaining groove in the inner wall;
   wherein the billet contacting inner portion is moveable relative to the outer carrier portion, the inner wall defines a billet-receiving cavity.

2. The billet carrier assembly of claim 1, further comprising a spring provided between the outer carrier portion and the billet-contacting inner portion to allow resisted movement of the inner portion within the outer carrier portion.

3. The billet carrier assembly of claim 1, wherein the outer carrier portion is configured to attach to the conveyor.

4. The billet carrier assembly of claim 3, wherein the conveyor comprises a continuous chain conveyor.

5. The billet carrier assembly of claim 1, wherein at least a portion of the inner wall comprises a tapered surface between the billet-retaining groove and the top of the billet carrier for guiding a form mold of a thermoformer into alignment over the thermoformable billet.

6. The billet carrier assembly of claim 1, further comprising a billet situated in the billet-contacting inner portion, and the billet-receiving cavity has a cross-cavity width measured from opposite sides of the inner wall between the billet-retaining groove and the top of the billet carrier adjacent to the billet-retaining groove that is less than the width of the major surface of the thermoformable billet.

7. The billet carrier assembly of claim 6, wherein the billet receiving cavity has a width measured across the inner wall from within the billet-retaining groove that is less than the width of the major surface of the thermoformable billet.

8. The billet carrier assembly of claim 1, further comprising an arm adapted to attach to the conveyor, the arm being configured to extend the billet-contacting inner portion away from the conveyor when attached to the conveyor.

9. The billet carrier assembly of claim 1, wherein the billet carrier comprises an external flange.

10. The billet carrier assembly of claim 1, wherein the inner wall of the billet carrier comprises a ledge proximal to the bottom.

11. The billet carrier assembly of claim 1, wherein the cross-cavity width of the billet-receiving cavity measured from opposite sides of the inner wall between the billet-retaining groove and the top of the billet carrier adjacent to the billet-retaining groove is substantially the same as the cross-cavity width of the billet-receiving cavity measured from opposite sides of the inner wall between the billet-retaining groove and the bottom of the billet carrier adjacent to the billet-retaining groove.

12. The billet carrier assembly of claim 1, wherein the major surface of the thermoformable billet is a bottom major surface, the thermoformable billet further has a top major surface, and no more than about 20% of each of the bottom and top major surfaces are covered by the billet carrier assembly.

13. The billet carrier assembly of claim 6, wherein the major surface of the thermoformable billet is a bottom major surface, the thermoformable billet further has a top major surface, and no more than about 5% of each of the bottom and top major surfaces are covered by the billet carrier assembly.

14. The billet carrier assembly of claim 6, wherein the major surface of the thermoformable billet is a bottom major surface, the thermoformable billet further has a top major surface, and no more than about 1% of each of the bottom and top major surfaces are covered by the billet carrier assembly.

15. The billet carrier assembly of claim 6, wherein the major surface of the thermoformable billet is a bottom major surface, the thermoformable billet further has a top major surface, a perimeter, and a center, and no more than about 5 mm of each of the bottom and top major billet surfaces, measured from the perimeter of the thermoformable billet to the center of the thermoformable billet, is covered by the billet carrier assembly.

16. The billet carrier assembly of claim 6, wherein the major surface of the thermoformable billet is a bottom major surface, the thermoformable billet further has a top major surface, a perimeter, and a center, and no more than about 1 mm of each of the bottom and top major billet surfaces, measured from the perimeter of the thermoformable billet to the center of the thermoformable billet, is covered by the billet carrier assembly.

17. The billet carrier assembly of claim 1, wherein the inner wall is flangeless.

18. The billet carrier assembly of claim 1, wherein the billet-contacting inner portion further comprises a heat resistant coating.

19. The billet carrier assembly of claim 1, wherein the outer carrier portion further comprises a heat resistant coating.

20. A billet carrier assembly comprising:
a billet carrier adapted to contain a thermoformable billet having a major surface, the billet carrier comprising a top, a bottom, and an inner wall extending between the top and the bottom around a billet-receiving cavity, the inner wall having at least one portion defining a billet-receiving cavity having a cross-cavity width measured from opposite sides of the inner wall across the cavity that is less than the width of the major surface of the thermoformable billet, the at least one portion of the inner wall having a billet-retaining groove situated therein, wherein the cross-cavity width of the billet-receiving cavity measured from opposite sides of the inner wall between the billet-retaining groove and the top of the billet carrier adjacent to the billet-retaining groove is substantially the same as the cross-cavity width of the billet-receiving cavity measured from opposite sides of the inner wall between the billet-retaining groove and the bottom of the billet carrier adjacent to the billet-retaining groove.

21. A billet carrier assembly for transporting billets on a conveyor comprising:
an outer carrier portion;
a billet-contacting inner portion attached to and situated within the outer carrier portion, the billet contacting inner portion having a top, a bottom, an inner wall extending from the top to the bottom; and
a spring provided between the outer carrier portion and the billet-contacting inner portion to allow resisted movement of the inner portion within the outer carrier portion, wherein the billet contacting inner portion is moveable relative to the outer carrier portion.

22. The billet carrier assembly of claim 21, wherein the spring is a wave spring.

* * * * *